United States Patent [19]

Maiocco

[11] 4,309,882
[45] Jan. 12, 1982

[54] ANTITHEFT DEVICE FOR MOTOR VEHICLES

[75] Inventor: Guiseppe Maiocco, Rivoli, Italy

[73] Assignee: Arman S.p.A., Druento, Italy

[21] Appl. No.: 151,960

[22] Filed: May 21, 1980

[30] Foreign Application Priority Data

May 25, 1979 [IT] Italy ................ 68123 A/79

[51] Int. Cl.³ .............. E05B 27/00; E05B 65/12; B60R 25/02
[52] U.S. Cl. ................................ 70/186; 70/252
[58] Field of Search ........................ 70/186, 252

[56] References Cited

U.S. PATENT DOCUMENTS

| | | | |
|---|---|---|---|
| 2,011,269 | 8/1935 | Carlson | 70/252 X |
| 2,148,609 | 2/1939 | Edwards | 70/252 |
| 2,203,949 | 6/1940 | Edwards | 70/252 X |
| 2,207,164 | 7/1940 | Sandberg | 70/252 X |
| 3,530,697 | 9/1970 | Warnod | 70/252 |
| 3,613,412 | 10/1971 | Yamaguchi | 70/252 |
| 3,641,489 | 2/1972 | Shimomura | 70/252 X |
| 3,739,610 | 6/1973 | Kuroki | 70/252 |
| 3,914,967 | 10/1975 | Arman | 70/252 |
| 3,985,009 | 10/1976 | Lipschutz | 70/252 |

FOREIGN PATENT DOCUMENTS

| | | | |
|---|---|---|---|
| 2711700 | 9/1978 | Fed. Rep. of Germany | 70/252 |
| 1539404 | 6/1968 | France | 70/252 |
| 2330569 | 6/1977 | France | 70/252 |
| 611562 | 6/1979 | Switzerland | 70/252 |
| 1326190 | 8/1973 | United Kingdom | 70/252 |
| 1561379 | 2/1980 | United Kingdom | 70/252 |

Primary Examiner—Roy D. Frazier
Assistant Examiner—Carl F. Pietruszka
Attorney, Agent, or Firm—John C. Purdue

[57] ABSTRACT

An antitheft device for a steering shaft of a motor vehicle has a latch which is movable between a latching and an unlatching position with respect to said steering shaft. A stop element in the form of a ball is provided in a radially extending opening in a stationary cylinder. The ball overhangs a projecting portion of the latch to prevent the projecting portion of the latch from moving past the ball. A rotating cylinder into which a key is inserted is rotatably mounted on the inside of the stationary cylinder and has a pair of circumferentially and longitudinally spaced detents into which the ball moves as the rotating cylinder moves past the radially extending opening. When the ball drops in the remote one of the detents, the projecting portion of the latch moves past the ball whereupon movement of the rotating cylinder moves the ball out of the detent to prevent the projecting portion of the latch from accidentally moving past the ball. The stop element or ball holds the latch retracted to prevent accidental locking of the steering shaft when a key is in the lock. The other detent permits the ball to move radially when the key is removed from the lock so that the latch can be moved to lock the steering shaft.

12 Claims, 16 Drawing Figures

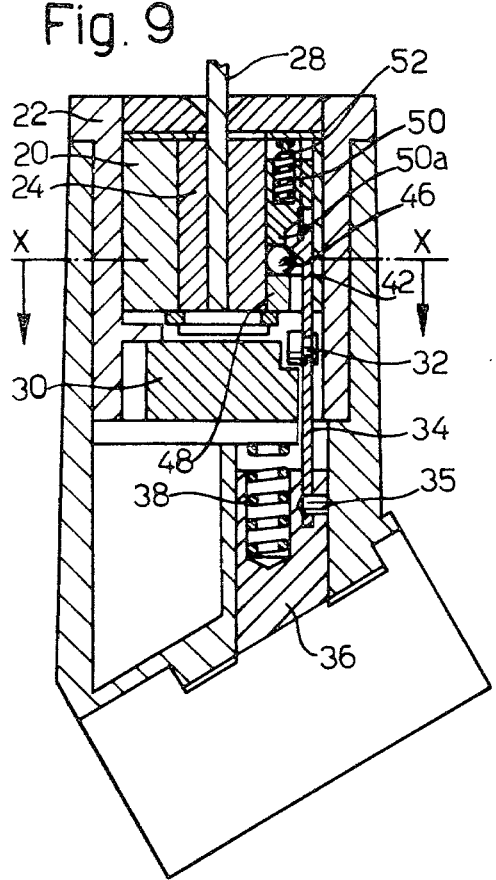
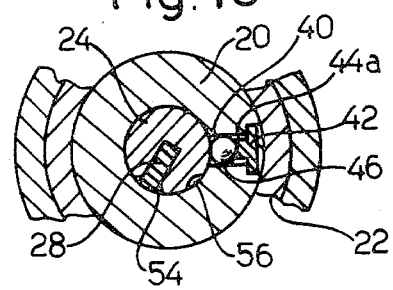
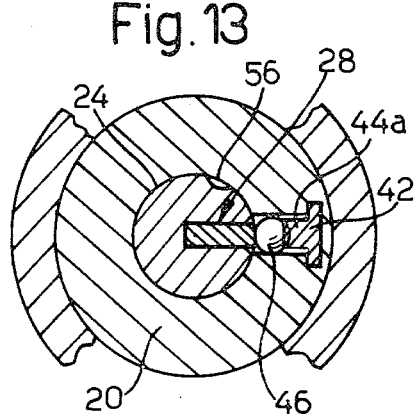
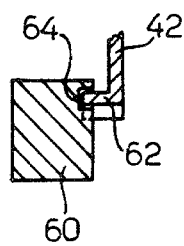
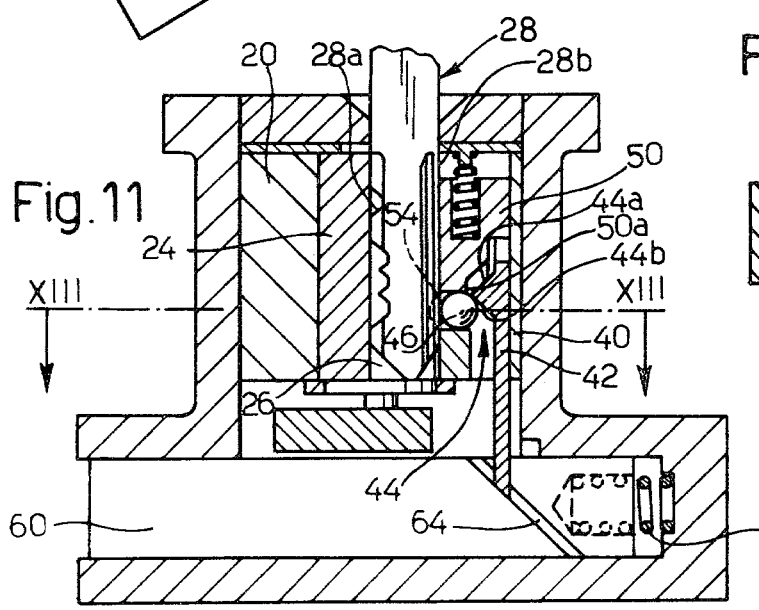

ANTITHEFT DEVICE FOR MOTOR VEHICLES

BACKGROUND OF THE INVENTION

1. Field of the Invention

The present invention relates to an antitheft device and, more particularly, to an antitheft device for locking the steering shaft of a motor vehicle.

2. Description of the Prior Art

Antitheft devices known heretofore are operated by means of a cylinder lock and are provided with a latch which is brought into a locking position by a spring when the ignition key is extracted from the rotating cylinder portion of the lock. A rod is associated with the latch, said rod being slidingly mounted in an axial hole of a stationary cylinder portion of the lock and co-operating with a stop element axially movable with said rod during the unlocking movement of the latch and radially movable with respect to said rod at the end of the unlocking movement of the latch. The locking and unlocking mechanism comprises a first control member carried by the lock and projecting in said axial hole of the stationary cylinder and a second control member carried by said rod, the relative position of the stop element with respect to one of the two control members depends on the presence of the key in the lock. The stop element prevents the accidental movement of the latch into the locking position when the key is inserted in the rotating cylinder of the lock.

An antitheft device of the above described type is disclosed in the Italian Pat. No. 895,981 wherein the stop element consists of a movable roller loosely fitted in a window provided in the rod of the latch. The roller is retained by a leaf spring carried by the rod of the latch and is able to cooperate with a control ratchet sliding radially in a radial hole of the stationary cylinder and ending in the key slot of the rotating cylinder of the lock. The ratchet has a wedge-shaped outer end which, when the key is inserted in the key slot and the ratchet is radially moved, comes into the path of the roller carried by the rod of the latch. During the unlocking movement of the latch, the contact between the end of the ratchet and the surface of the roller causes a radial outward displacement of said roller against the action of said leaf spring, so as to enable the roller to jump onto the ratchet, said roller being then engaged between the end of the ratchet and a heel-shaped part adjacent to the window of the rod, whereby the latch is blocked in its unlocked position. The extraction of the key from the rotating cylinder of the lock causes a radial inward displacement of the ratchet and thereby a disengagement of the roller from said ratchet, so as to enable the latch to be driven into the locking position.

The above described known antitheft device comprises a large number of parts, so that the manufacture of said device is complex and expensive. Moreover, since the blocking of the latch in its unlocked position is made possible by the presence of an elastic element which is easily subject to wear, the device has a poor degree of reliability.

SUMMARY OF THE INVENTION

The object of the present invention is to provide an antitheft device for locking the steering shaft of motor vehicles comprising a reduced number of parts which, therefore, can be economically manufactured and has a high degree of reliability.

According to the invention, the technical problem is solved as follows:

(a) The stop element consists of a ball inserted between the rod of the latch and the rotating cylinder of the lock.

(b) The cylindrical surface of the rotating cylinder is provided with a first substantially hemispherical cavity or recess extending into the key slot and a second substantially hemispherical cavity or recess angularly displaced and axially positioned towards the upper end portion of the rotating cylinder with respect to the first cavity, said two cavities being able to be engaged by the ball, first, when the key is removed and, secondly, at the end of the unlocking movement of the latch.

(c) The control element carried by the lock is a part of the stationary cylinder adjacent to the lower end portion of the rotating cylinder.

(d) The axial hole of the stationary cylinder has a reaction surface facing the ball on the opposite side of the control element carried by the lock.

(e) The control element carried by the rod consists of a projection directed towards the rotating cylinder and having two respectively upper and lower inclined surfaces converging towards the free end of said projection, the upper inclined surface bearing against the ball during the unlocking movement of the latch and the lower inclined surface bearing against the ball at the end of said unlocking movement. Indeed, when the ball enters in the second cavity of the rotating cylinder, it jumps over the free end portion of said projection under the action of said reaction surface.

BRIEF DESCRIPTION OF THE DRAWINGS

The invention will now be described with reference to the attached drawings given purely as non-limitative examples and in which:

FIG. 9 is a sectional view similar to that of FIG. 1 in a fourth subsequent phase of operation;

FIG. 10 is a cross section along the line X—X of FIG. 9;

FIG. 11 is a sectional view similar to that of FIG. 3 illustrating a second embodiment of the invention;

FIG. 12 is an axial section of a feature illustrated in FIG. 11;

FIG. 13 is a cross section along the line XIII—XIII of FIG. 11;

DESCRIPTION OF THE PREFERRED EMBODIMENT

Figure 1:
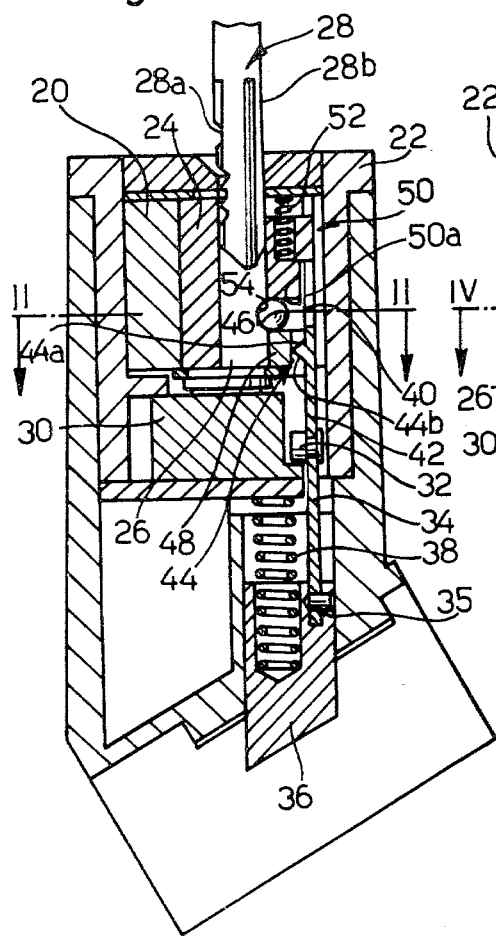
FIG. 1 is a partial and schematic axial section of a first embodiment of the antitheft device according to the invention, in the initial phase of insertion of the ignition key into the lock.

As shown in FIGS. 1 to 10, reference numeral 20 indicates the stationary cylinder of a cylinder lock inserted in a tubular casing 22 of an antitheft device for locking the steering shaft of a motor vehicle. In the stationary cylinder 20 is positioned a rotating cylinder 24 provided with a slot 26 capable of receiving the ignition key 28. On one of its sides, this key 28 is provided with a notched profile capable of co-operating, in a manner known per se, with notched members (not shown) of the lock and on its other side, said key 28 is provided with a smooth edge 28b opposed to the notched profile 28a. The bottom of the rotating cylinder 24 is linked, in a manner known per se, to a helical cam 30 co-operating with a cam follower 32 carried by a control rod 34 rigidly connected at 35 to the latch 36. The latch 36, the direction of movement of which is parallel to the axis of the rotating cylinder 24, is capable of preventing, in a manner known per se, the rotation of the steering shaft of a motor vehicle. The latch 36 is subject, in a manner known per se, to the action of a coil spring 38 which urges it into its locking position.

The stationary cylinder 20 is provided with an axial hole 40 wherein is positioned the axial rod 42 which is an extension of the control rod 34 of the latch 36. The rod 42 is provided, near its free end portion, with a projection 44 consisting of a wedgeshaped part having an upper inclined surface 44a and a lower inclined surface 44b converging towards the free end of said projection 44.

A stop element in the form of a sphere or ball member 46 is provided in the axial hole 40 of the stationary cylinder 20 between the rod 42 and the rotating cylinder 24. Said ball or sphere 46 is axially positioned between a part 48 of the stationary cylinder 20 and the bottom surface 50a of a sliding member 50 capable of axially sliding in the axial hole 40 and urged against the ball member 46 by a coil spring 52 axially positioned between said sliding member 50 and the upper end portion of the stationary cylinder 20.

The diameter of the sphere 46 is substantially equal to the distance between the two cylindrical walls of the stationary cylinder 20 and is slightly larger than the distance between the surface of the rotating cylinder 24 and the free end of the projection 44 of the rod 42. Said ball member or sphere 46 is able to co-operate, as further described hereunder, with a pair of semispherical cavities or recesses 54,56 provided in the outer cylindrical surface of the rotating cylinder 24. The cavity 54 is positioned at the edge of the key slot 26, whereas the cavity 56 is angularly displaced and axially positioned towards the upper end of the rotating cylinder 24 with respect to the cavity 54.

A second embodiment of the device, illustrated in FIGS. 11 to 13, differs from the first described embodiment only by the fact that the latch 60 is able to slide in a direction which is perpendicular to the axis of the rotating cylinder 24. In this embodiment, the rod 42, co-operating with the ball 46, is provided with a projection 62 (FIG. 12) extending perpendicularly from its bottom end, said projection 62 sliding in an inclined groove 64 formed in a side wall of the latch 60. The sliding movement of the latch 60, in a direction which is perpendicular to the axis of the rotating cylinder 24, is thus converted into an axial sliding movement of the rod 42.

Figure 14:
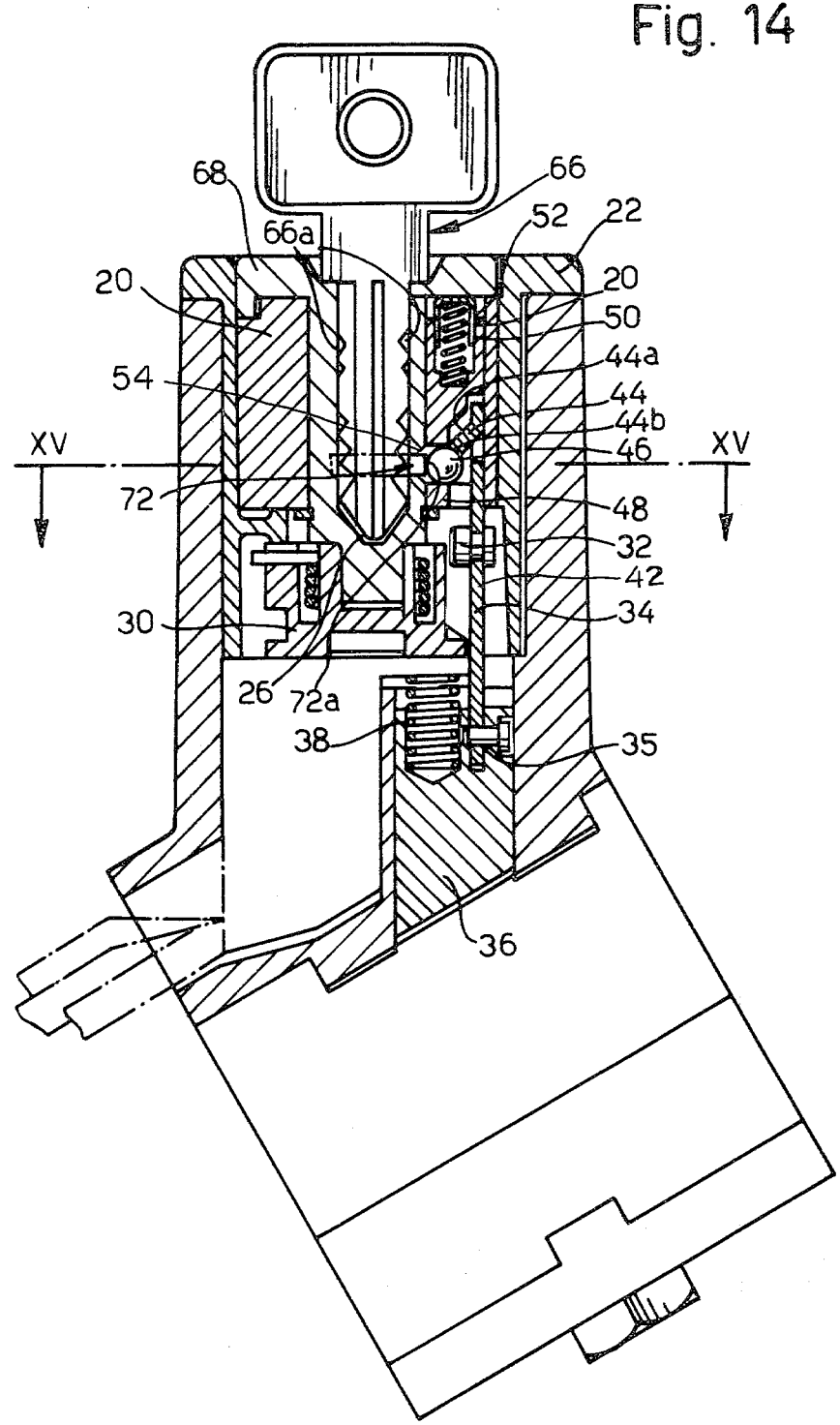
FIG. 14 is a sectional view similar to that of FIG. 3, illustrating a third embodiment of the invention.
Figure 15:
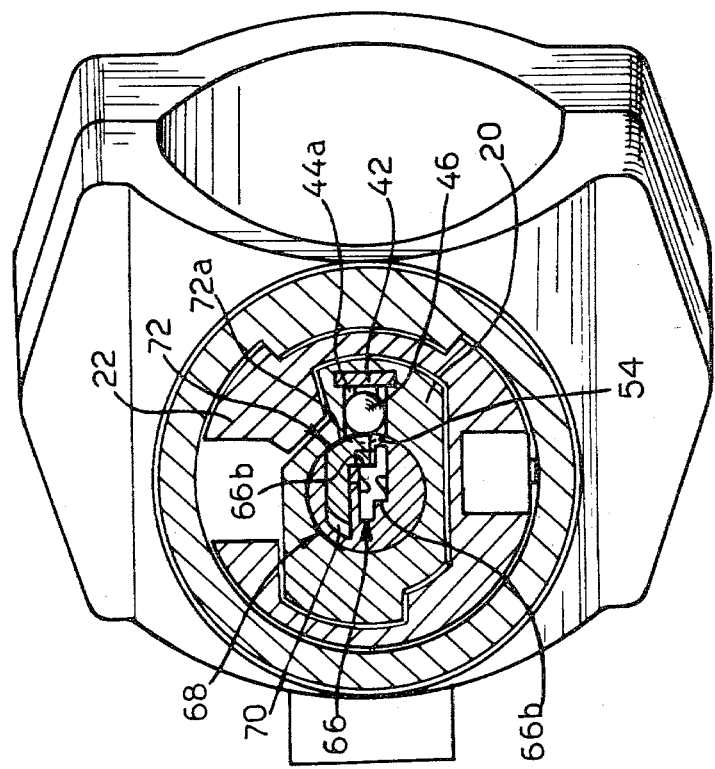
FIG. 15 is a cross section along the line XV—XV of FIG. 14.

In a third embodiment of the device, illustrated in FIGS. 14 and 15, the cylinder lock is of a type that may be operated by a reversible key 66, which has two identical and opposed notched profiles 66a. On the side of each notched profile 66a, the key 66 is provided with a flat surface 66b which is perpendicular to the plane of the key 66 and extends longitudinally at the base of the respective notched profile 66a. The rotating cylinder 68 of the lock is provided with a transverse groove 70 facing the recess 54 and in which groove 70 is placed a radially sliding, substantially L-shaped small plate 72 provided with a cylindrical surface facing said recess 54. The small plate 72 is similar to the one disclosed in my copending U.S. application Ser. No. 113,754, filed Jan. 21, 1980. Said small plate 72 is movable between a retracted position, in which position it extends in the pathway of the key 66 when said key 66 is removed from the slot 26 of the rotating cylinder 68, and an extracted position, in which its cylindrical surface 72a extends in the recess 54 of the rotating cylinder 68, because of the insertion of the key 66 into the slot 26. The small plate 72 thus forces the radial outward movement of the ball 46 when the key 66 is introduced into the slot 26 of the rotating cylinder 68.

In this third embodiment, the rod 42, which is an extension of the control rod 34 of the latch 36, is made of a metal sheet and the projection 44 is made by cutting partially and folding the rod 42.

Figure 16:
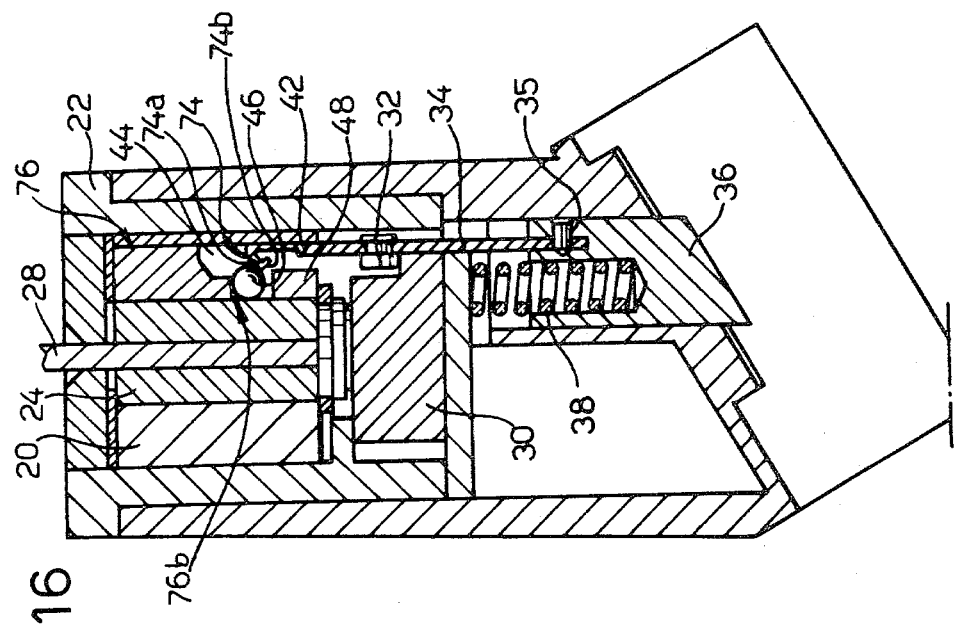
FIG. 16 is a sectional view similar to that of FIG. 5 illustrating a fourth embodiment of the invention.

A fourth embodiment of the device, illustrated in FIG. 16, differs from the embodiment shown in FIGS. 1 to 10 by the fact that the projection 74 of the rod 42 consists of an elastic, L-shaped small plate secured to the free end portion of the rod 42 and the branches 74a and 74b of which define the two earlier mentioned upper and lower surfaces which are able to co-operate with the ball 46. The function of the elastic small plate 74 is similar to that of the spring 52 described in reference to FIGS. 1 to 10, which is thus not described in this embodiment. The reaction surface 76b against which the ball 46 acts at the end of the unlocking movement of the latch 36 is the bottom surface of a part 76 of the stationary cylinder 20. In order to avoid any movement between the small plate 74 and the ball 46 in the unlocked position of the latch 36, the load of the spring 38, which urges said latch into its locking position, is lower than the load which is necessary for causing an elastic deformation of the small plate 74 sufficient to release the latch.

The operations of the second, third and fourth embodiments are quite similar to the operation of the first embodiment previously described.

INDUSTRIAL APPLICABILITY

Figure 2:
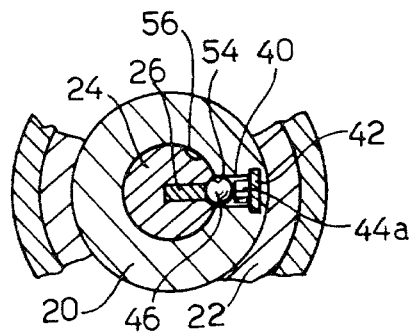
FIG. 2 is a cross section along the line II—II of FIG. 1.

The antitheft device according to the invention operates as follows: in the initial phase shown in FIGS. 1 and 2, the key 28 has not yet been introduced into the lock and the latch 36 is maintained in its locking position by the spring 38. The ball member 46, axially urged by the sliding member 50 against part 48 of the stationary cylinder 20, is positioned in the cavity 54 of the rotating cylinder 24. The projection 44 of the axial rod 42 is spaced from the ball 46 and is positioned in front of the part 48 of the stationary cylinder 20.

When the key 28 is inserted into the slot 26 of the lock (FIGS. 3 and 4), a part of the edge 28b of said key 28 enters into the cavity 54 of the rotating cylinder 24, so as to radially move the ball 46 in the outward direction.

Subsequently, when the key 28 is turned, and thus also the cylinder 24 and the cam 30 associated with said rotating cylinder 24, the latch 36 moves gradually upwards towards its unlocked position, against the action of the spring 38. At the same time the rod 42 moves upwards within the axial hole 40 of the stationary cylinder 20, so as to bring the upper surface 44a of the projection 44 in contact with the ball or sphere 46.

Upon further rotation of the key (FIGS. 5 and 6), the ball 46 is axially moved upwards by the projection 44 of the rod 42 simultaneously displacing the sliding member 50 so as to compress the spring 52.

As the rotation of the key 28 is continued (FIGS. 7 and 8), the cavity 56 of the rotating cylinder 24 moves into a position where it is opposite to the ball 46. Due to the shape of the projection 44, the ball 46 radially moves inwardly so as to enter into the cavity 56. Because of this movement and because of the presence of the reaction surface 50a of the sliding member 50, said ball 46 jumps over the free end of the projection 44.

When the key 28 is further turned (FIGS. 9 and 10), the ball 46 is disengaged from the cavity 56 and, under the action of the spring 52 acting upon the sliding member 50, it is brought back in contact with part 48 of the stationary cylinder 20. Under these circumstances, the lower surface 44b of the projection 44 rests upon the sphere 46, thereby preventing an accidental downward displacement of the latch 36 into its locking position. These conditions are maintained no matter what is the angular position of the key 28.

Figure 3:
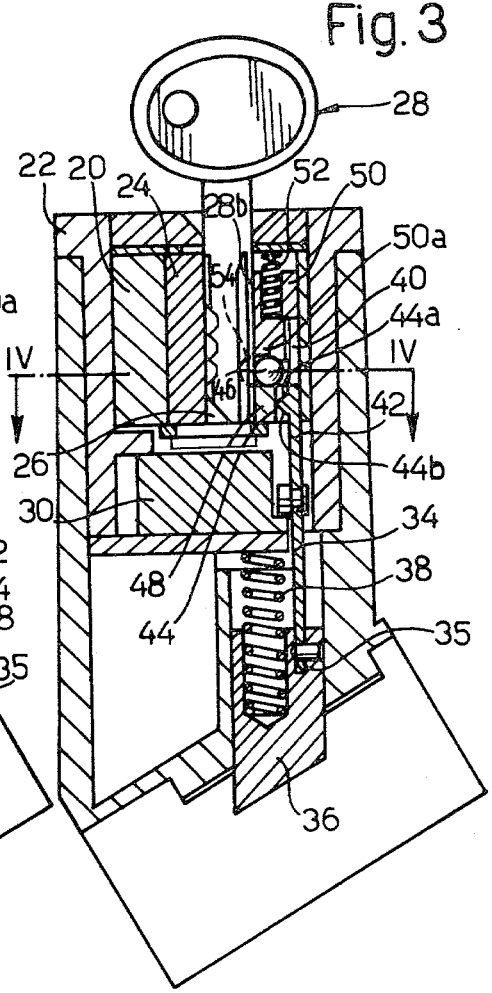
FIG. 3 is a sectional view similar to FIG. 1 in a first subsequent phase of operation.
Figure 4:
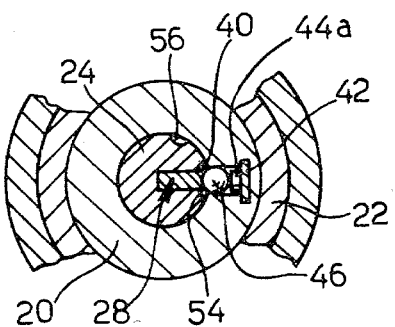
FIG. 4 is a cross section along the line IV—IV of FIG. 3.
Figure 5:
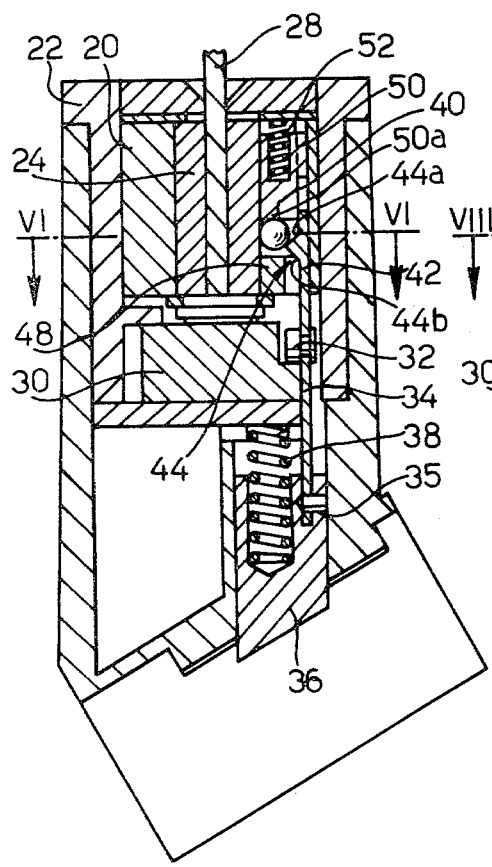
FIG. 5 is a sectional view similar to that of FIG. 1 in a second subsequent phase of operation.

In order to disengage the projection 44 from the ball 46, so as to permit the locking movement of the latch 36, it is sufficient to turn the key 28 into the initial position illustrated in FIGS. 3 and 4 and to remove said key 28 from the slot 26. The disengagement of the edge 28b of the key 28 from the cavity 54 of the rotating cylinder 24 allows the ball 46 to enter into said cavity 54 and thus to release the ball from the projection 44.

Figure 7:
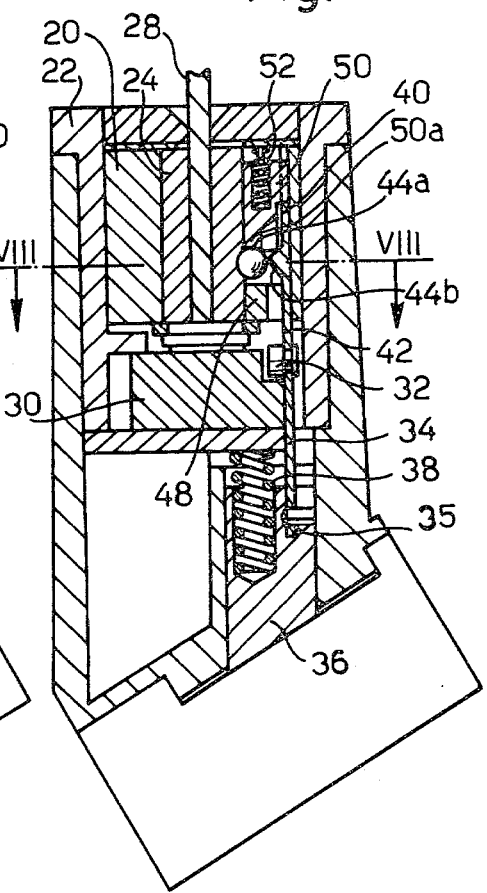
FIG. 7 is a sectional view similar to that of FIG. 1 in a third subsequent step of operation.
Figure 6:
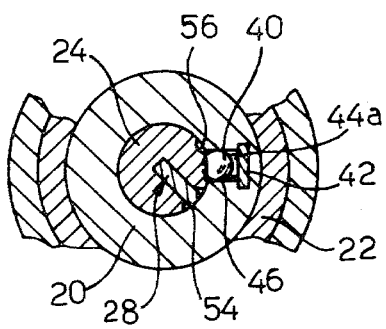
FIG. 6 is a cross section along the line VI—VI of FIG. 5.
Figure 8:
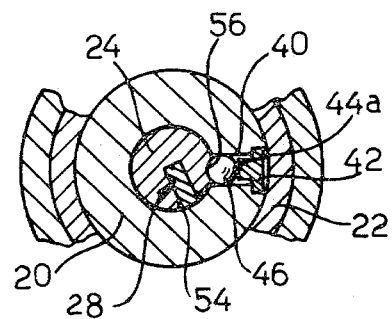
FIG. 8 is a cross section along the line VIII—VIII of FIG. 7.

The function of the spring 52 associated with the sliding member 50 is only to increase the safety of the device, by preventing, in the angular position of the key 28 corresponding to that illustrated in FIGS. 7 and 8, an accidental axial displacement of the ball 46 and thereby its engagement into the cavity 56 of the rotating cylinder 24.

It will be understood that the invention is not limited to the exact embodiments shown and described, but that various changes and/or modifications may be made without departing from the spirit and scope of the invention as defined in the appended claims.

I claim:

1. An antitheft device for locking the steering shaft, which can be operated by means of a cylinder lock and is provided with a latch which is brought into its locking position by a spring when the ignition key is extracted from the rotating cylinder of the lock, for preventing the rotation of the shaft of the steering wheel of a motor vehicle, a rod associated with said latch, said rod being slidingly mounted in an axial hole of a stationary cylinder, a stop element co-operating with said rod and being axially movable with said rod during the unlocking movement of the latch and radially movable with respect to said rod at the end of the unlocking movement of the latch, a first control member carried by the lock and projecting in said axial hole of the stationary cylinder, a second control member carried by said rod, the relative position of said stop element with respect to one of the two control members depending on the presence of the key in the lock and said stop element preventing the accidental movement of the latch into its locking position when the key is inserted in the rotating cylinder of the lock, characterized in that:

the stop element consists of a ball (46) inserted between the rod (42) of the latch (36,60) and the rotating cylinder (24,68) of the lock, the cylindrical surface of the rotating cylinder (24,68) is provided with a first substantially hemispherical cavity or recess (54) extending into the key slot (26) and a second substantially hemispherical cavity or recess (56) angularly displaced and axially positioned towards the upper end portion of the rotating cylinder (24,68) with respect to the first cavity (54), said cavities (54,56) being able to be engaged by said ball (46), respectively, when the key (28,66) is removed and at the end of the unlocking movement of the latch (36,60), the first control member carried by the lock is a part (48) of the stationary cylinder (20) adjacent to the lower end portion of the rotating cylinder (24,68), the axial hole (40) of the stationary cylinder (20) is provided with a reaction surface (50a,76a) facing the ball (46) on the opposite side of the first control member (48) carried by the lock, the second control member carried by the rod (42) consists of a projection (44,74) directed towards the rotating cylinder (24,68) and having two respectively upper and lower inclined surfaces (44a,44b; 74a,74b) converging towards the free end of said projection (44,74), the upper inclined surface (44a,74a) bearing against the ball (46) during the unlocking movement of the latch (36,60) and the lower inclined surface (44b,74b) bearing against the ball (46) at the end of said unlocking movement, said ball (46) moves from the upper inclined surface (44a,74a) to the lower inclined surface (44b,74b) over the free end of said projection (44,74) when the ball (46) seats in the second cavity (56) of the rotating cylinder (24,68) and under the action of said reaction surface (50a,76a).

2. A device according to claim 1, characterized in that spring means (52,72) axially urge the ball (46) toward the part (48) of the stationary cylinder (20) acting as a control member.

3. A device according to claim 1, characterized in that said projection of the rod (42) consists of a wedge-shaped portion (44) integral with said rod (42).

4. A device according to claim 3, characterized in that said rod (42) is made of a metallic strip and said projection (44) is created by partially cutting and folding the rod (42).

5. A device according to claim 3, characterized in that said reaction surface consists of the bottom surface (50a) of a sliding member (50) which extends in the axial hole (40) of the stationary cylinder (20) and is urged against said ball (46) by a coil spring (52) axially inserted between said sliding member (50) and the upper end portion of the stationary cylinder (20).

6. A device according to claim 1, characterized in that said projection of the rod (42) consists of an elastic L-shaped blade (74) carried by the free end portion of the rod (42).

7. A device according to claim 6, characterized in that said reaction surface corresponds to the bottom surface (76a) of a portion of the stationary cylinder (20) extending in said axial hole (40).

8. A device according to claim 6, characterized in that the load of the spring (38) which causes the locking movement of the latch (36,60) is lower than the load necessary for causing an elastic deformation of said elastic blade (74).

9. A device according to claim 1 wherein the moving direction of the latch is parallel to the axis of the rotating cylinder, characterized in that the rod (42) co-operating with the ball (46) is rigidly fixed to the latch (36).

10. A device according to claim 1 wherein the moving direction of the latch is perpendicular to the axis of the rotating cylinder, characterized in that it comprises connecting means (62,64) between the rod (42) co-operating with the ball (46) and the latch (60) for converting the sliding movement of the latch (60) into a sliding movement of the rod (42) perpendicular to the movement of the latch (60).

11. A device according to claim 10, characterized in that said connecting means comprise a projection (62) extending perpendicularly from the inner surface of the rod (42) and slidingly engaged in an inclined groove (64) provided in a side wall of the latch (60).

12. A device according to claim 1 wherein the cylinder lock is of the type which is operable by means of a key having two identical and opposed notched profiles and provided on the side and beneath of each notched profile with a flat surface substantially perpendicular to the plane of the key, characterized in that it comprises a radially sliding small plate (72) positioned in the rotating cylinder (68) of the lock and provided with a cylindrical surface (72a) facing said first recess (54) of the rotating cylinder (68) and co-operating with said ball (46), said small plate (72) being movable between a retracted position in which it (72) extends in the pathway of the key (66) when said key (66) is removed from the key slot, and an extracted position in which said cylindrical surface (72a) extends in said first recess (54) of the rotating cylinder (68) when the key (66) is inserted in the key slot.

* * * * *